United States Patent [19]

Stuchlik

[11] 3,907,033

[45] Sept. 23, 1975

[54] CORROSION RESISTANT LAMINATED PIPE

[76] Inventor: John A. Stuchlik, 1106 1st Ave. North, Aurora, Nebr. 68818

[22] Filed: June 4, 1973

[21] Appl. No.: 366,772

[52] U.S. Cl. ............ 166/228; 138/178; 138/DIG. 2; 166/236
[51] Int. Cl.² ......................................... E21B 43/04
[58] Field of Search ....... 138/178, DIG. 2; 166/227, 166/236, 228

[56] References Cited
UNITED STATES PATENTS

| 173,436 | 2/1876 | Ballou .................................. 138/141 |
| 231,832 | 8/1880 | Merriam ........................ 138/146 X |
| 2,577,205 | 12/1951 | Meyer et al. .................... 138/DIG. 2 |
| 2,969,840 | 1/1961 | D'Audiffret et al. ........... 166/227 X |
| 3,502,145 | 3/1970 | Du Mee et al. ................. 166/236 X |
| 3,638,726 | 2/1972 | Sibley ................................. 166/236 |

*Primary Examiner*—Richard C. Queisser
*Assistant Examiner*—Daniel M. Yasich
*Attorney, Agent, or Firm*—Hiram A. Sturges

[57] ABSTRACT

A corrosion resistant pipe comprising an elongated outer tube formed of a synthetic resin containing reinforcing fibers, and an inner tube having an outer wall bonded to the inner wall of the outer tube, the inner tube being formed of asbestos-cement.

A well having the pipe for a liner in which the pipe can be imperforate or provided with perforations or slots to let water flow therethrough.

8 Claims, 4 Drawing Figures

US Patent    Sept. 23,1975    3,907,033

CORROSION RESISTANT LAMINATED PIPE

FIELD OF THE INVENTION

This invention is in the field of pipes and tubes for various uses where corrosion resistance is important and where economy of the product and ease of handling are important to the over-all cost, such as is particularly the case in the field of well casings, whereby this invention is also in the field of well casings.

DESCRIPTION OF THE PRIOR ART

Steel well casings are easily corroded. Fiberglass tubes are on the market today for use as well casings and are corrosion resistant, but are expensive.

When fiberglass is thin enough to be economical it is so flexible that it bends excessively and the only way to reduce this excessive bending of a tubular fiberglass well casing is to make it so thick that it cannot compete in the price-bidding on well work.

Tubes of asbestos-cement have been used for years in the lining of wells. However, asbestos-cement pipe linings have not gained in popularity as fast, in my opinion, as they could.

The disadvantage of asbestos-cement pipe is that although it is corrosion resistant and light in weight, nevertheless it is inherently weak and brittle. Impact forces against the sides or ends of brittle asbestos pipe cause it to crack and break.

It is an object of this invention, therefore, to provide a stiff, strong, economical combination pipe, or in a sense, a pipe within a pipe, the outer pipe or tube being fixed to the inner pipe or tube all along its length, the inner pipe being weak, corrosion-resistant, light asbestos, and the outer pipe being corrosion-resistant fiberglass, the two pipes being imperforate for some uses, including use as well-casings in some soils, or being provided with many perforations or saw-cut slits for use in well casings in soils in which it is desired that water flow through the sides of the pipe.

SUMMARY OF THE INVENTION

A corrosion-resistant pipe, which is, in effect, a pipe within a pipe, formed of an outer elongated pipe or tube composed of synthetic resin reinforced with fiber contained in the resin, and having an inner tube formed of a material containing asbestos, the inner tube having an outer wall adjoining the inner wall of the outer tube, the adjoining walls being bonded together across all or the majority of their surface areas, the combination pipe being imperforate for some uses, and being perforated for other uses with the perforations extending continuously through both of the tubes thereof.

The combination pipe described in which its outer tube is specifically formed of fiberglass with the outer tube having a thickness of at least approximately one-sixteenth inch, said inner tube having a thickness of approximately one inch or more, and the inner tube being preferably cylindrical and having an inner wall diameter of approximately between eight and eighteen inches for use as a well casing section.

DESCRIPTION OF THE PREFERRED EMBODIMENT

Figure 1:
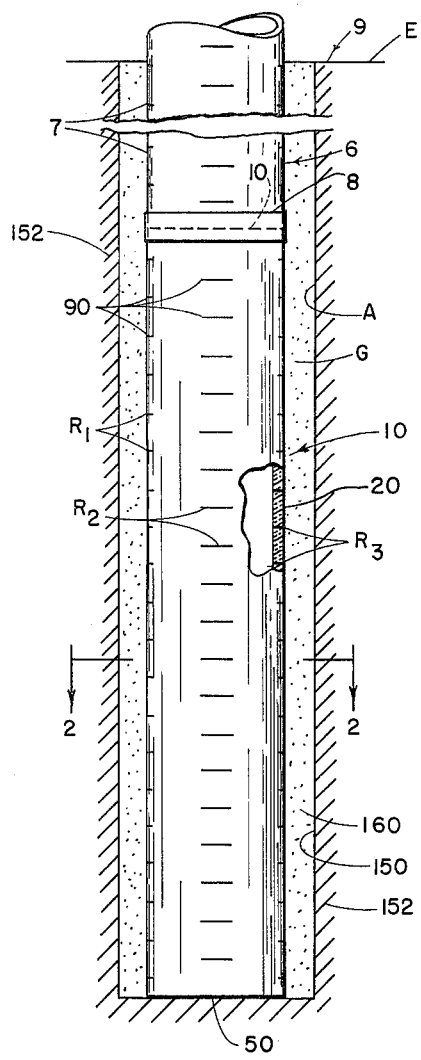
FIG. 1 is a cross-section taken in a vertical plane through a water well of this invention, showing attached corrosion-resistant well casing sections of this invention disposed therein, the latter shown in full lines, except for a broken-away portion and, therefore, is substantially as it would be seen in side elevation while it is standing vertically.

Referring to FIG. 1, a water well bore or drill hole is there shown at 150 extending into the earth 152 and a corrosion-resistant pipe or well casing 10 of this invention is disposed in the well opening or well bore or well drill hole 150, spaced from its sides by gravel 160 which has been placed between the drill hole 150 and the well casing 10 after the casing 10 has been lowered into the hole 150.

The pipe 10 is a corrosion-resistant pipe comprising an outer elongated first tube 20 formed of synthetic resin reinforced with fiber contained in the resin, the particular material preferably being fiberglass.

Inside the outer first tube 20 is an inner tube 12 formed of a material containing asbestos and preferably formed of a material called asbestos cement or transite, which is by nature both light and brittle. The asbestos-cement tube 12 would be stiff if used alone, especially with the dimensions used with this invention and this is an important characteristic of the inner tube 12.

The inner tube 12 has an outer wall 21 and an inner wall 24 both of which are preferably cylindrical and concentric. The outer tube 20 has inner and outer walls 81 and 82, respectively, which are both also preferably cylindrical and concentric. The inner tube 12 has its outer wall 21 adjoining an inner wall 81 of the outer tube 20. The adjoining walls 21 and 81 are bonded together across the majority of their surface areas by the cementing characteristic of the fiberglass resin in the outer tube 20.

One method of manufacture is to first make the inner tube 12 and then apply the fiberglass material to the outer surface, although it is also possible to manufacture the outer fiberglass and then form the inner tube 12 on its inner side.

There are many perforations or elongated slits 90 extending horizontally and extending completely through the combination pipe 10, whereby water from the gravel G can enter through the perforations or slits 90. Such slits are known in the prior art, but a slitted or perforated combination pipe 10 of this invention has never before been proposed.

Figure 2:
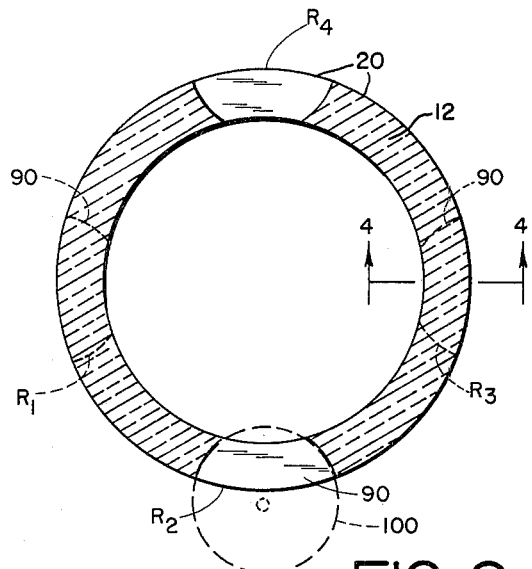
FIG. 2 is a sectional view taken along the line 2—2 of FIG. 1, except that FIG. 2 shows the well casing only, certain slits therein being shown in dotted lines and others shown in full lines, a saw blade being shown in dotted lines in a position at the end of a slit cutting step. The outer tube of the casing is so thin as not to be seen except as one line on the scale shown in FIG. 2.
Figure 4:
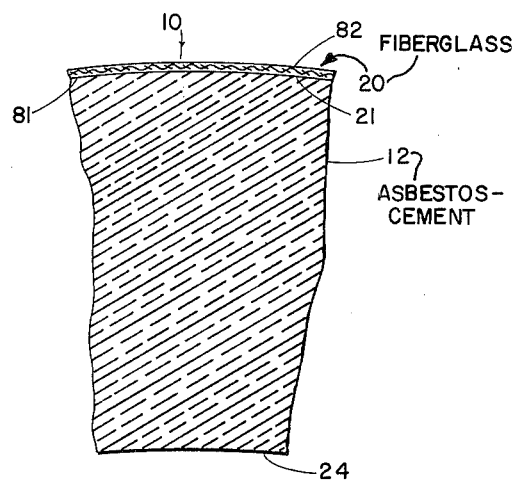
FIG. 4 is a sectional view taken along the line 4—4 of FIG. 2, but with the view rotated 90° counterclockwise, the view being an enlargement sufficient to show the outer tube.
Figure 3:
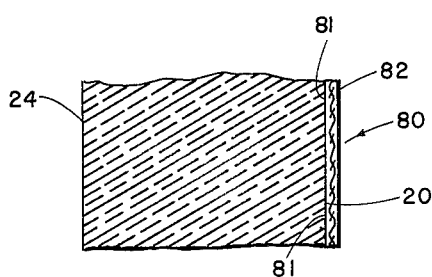
FIG. 3 is a vertical cross-section taken diagonally through the pipe of FIG. 1, but showing only one right side portion thereof, the view being an enlargement sufficient to show the outer tube between two spaced lines.

The slits 90 are made with a circular saw, the blade of which is indicated at 100 in FIG. 2 in dotted lines to show the position of the blade during cutting of the slit 90. Such slits can be on many sides of the pipe 10, as shown in FIGS. 1 and 2. Each perforation 90 extends completely through the outer tube 20 and the inner tube 12.

One example of dimensions would be that when the outer tube 20 is formed of fiberglass with inner and outer walls spaced apart one-sixty-fourth of an inch, then the inner tube 12 can be effectively made having the walls 21 and 24 thereof spaced apart approximately two and one-half inches. With these dimensions, the diameter of the inner wall of the inner tube can vary, but these dimensions will be very effective in use as a well casing with an inner tube inner wall diameter of approximately seventeen inches when the pipe 10 is used as a well casing, with both tubes being cylindrical on each vertical wall of each tube.

Another example: When the inner and outer walls of the outer fiberglass tube 20 are spaced apart at least one-sixteenth of an inch and with the total thickness of the inner tube 12 being approximately one inch, and in this case, with the inner and outer tube 12 and 20 being cylindrical on their respective inner and outer walls 24 and 20, 81 and 82, a dimension of the inner tube inner diameter which is approximately eighteen inches will be found effective in the use of the pipe as a well casing.

In both of the examples used herein, the pipe 10 is used for sections of well casing approximately thirteen feet long.

The combination pipe 10 described will be effective as a well casing with its outer tube specifically formed of fiberglass with the outer tube 20 having inner and outer walls 81 and 82 spaced apart at least approximately one-sixty-fourth inch to one-sixteenth inch or more, the inner tube 12 having inner and outer walls 24 and 21 spaced apart approximately three-fourths of an inch or more, and both tubes being preferably cylindrical, and the inner wall diameter of the inner tube being approximately seventeen or eighteen inches or less down to a practical minimum for well casings of eight inches, and the inner tube being formed of a material containing asbestos, such as asbestos-cement or transite. Making the inner tube thicker can make it possible to make the outer tube thinner and vice-versa to arrive at strength and stiffness characteristics needed.

The inner diameter of the inner tube can be increased if the thickness of the tubes are thick enough.

The length of a well casing pipe section in these examples is about thirteen feet, but longer lengths will have sufficient stiffness and strength if wall thicknesses of the tubes are proportional for added stiffness and strength according to the teachings herein.

The meaning of the term "approximately one inch" for the thickness of the inner tube of asbestos-cement would include, for example, that it could be three-fourths inch thick and, if attached inside of the outer tube of fiberglass about one-thirty-second of an inch thick, the result would be a pipe or well casing superior to those in the prior art.

I claim:
1. A well assembly comprising: a corrosionresistant pipe comprising a first elongated tube formed of synthetic resin containing fibers, said fibers being of a material which is bonded with said resin so as to reinforce said resin, said resin being a resin like fiberglass resin for use with fibers like fiberglass in the sense that it can be at first a liquid that later hardens after being mixed with a catalyst, and a second tube formed of a material the major portion of which is asbestos cement, said second tube being inside said first tube, said second tube having an outer wall adjoining the inner wall of said first tube, said adjoining walls being bonded together across the majority of their adjoining surface areas, the earth, said pipe being adapted for use in the earth, the earth having a certain portion adjacent to its outer surface, said certain earth portion having a well-opening extending downwardly into it from its outer surface, a porous material bordering said well opening, said pipe being disposed in said well-opening and serving as a well casing, said pipe having a plurality of perforations extending completely through both the first and second tubes thereof, said second tube having walls averaging at least seven times the thickness of the average thickness of the walls of said first tube, said first tube having an average thickness of at least one thirty-second of an inch, said second tube having an outer side having the area of a cylinder of a diameter between eight and eighteen inches.

2. The well casing of claim 1 in which said resin has a bonding characteristic and forms said bonding together of said tubes.

3. The well assembly of claim 1 in which the majority of the material of said first tube is fiberglass.

4. The well assembly of claim 1 in which the majority of the material of said first tube is fiberglass, and in which said resin has a bonding characteristic and forms said bonding together of said tubes.

5. The well assembly of claim 12 in which said tubes are substantially cylindrical on their inner and outer walls, and said first tube has a maximum thickness of three-thirty-seconds of an inch.

6. The well assembly of claim 1 in which said first tube has a wall thickness of an average of approximately one-sixteenth of an inch.

7. The well assembly of claim 1 in which said first tube is formed of fiberglass and has a thickness of approximately one-sixteenth inch, said second tube having an average thickness of approximately one inch, said second tube being cylindrical on its inner and outer walls and being between eight and eighteen inches in outside diameter.

8. The well assembly of claim 1 in which said first tube is substantially cylindrical on its inner and outer walls and said second tube has an inner wall diameter of approximately 17 inches.

* * * * *